United States Patent Office

Re. 24,318

Reissued May 14, 1957

24,318

METHOD OF STORING GASES OR LIQUIDS

Reginald L. Pattinson, Aylmer, Ontario, Canada, assignor, by mesne assignments, to Sid W. Richardson, Fort Worth, Tex.

No Drawing. Original No. 2,590,066, dated March 18, 1952, Serial No. 602,411, June 29, 1945. Application for reissue June 3, 1954, Serial No. 434,355. In Canada June 30, 1944

6 Claims. (Cl. 61—.5)

Matter enclosed in heavy brackets [ ] appears in the original patent but forms no part of this reissue specification; matter printed in italics indicates the additions made by reissue.

This invention relates to the storage of gases or liquids.

The difficulties relative to the provision of storage facilities for natural or manufactured gas for heating purposes are well recognized and have resulted in the curtailment of the use of such gas for heating purposes. Steel gas holders have been used for storage of manufactured gas but their cost has rendered impracticable the provision of such gas for heating purposes. The facilities for supplying gas for heating are largely unused during the summer and, to some extent, during the low heating periods of each day in the winter. Consequently, gas supplying firms who provide adequate facilities to take care of the peak heating load at all times find it difficult to supply gas at a suitably low cost to the consumer and yet receive a reasonable return on their inventment. The result has been that inadequate facilities are frequently provided to take care of peak loads. This shortage of gas is of course highly inconvenient to the consumer and sometimes constitutes a hazard.

It has been proposed to provide a storage of gas to take care of the peak heating load by pumping the produced gas into depleted or partly depleted gas fields. Very few of these fields are, however, available and their relief of the situation is infinitesimal. Moreover, gas stored in such fields is normally discharged from them much more slowly than is required.

It is an object of the present invention to provide a method of storing gases or liquids in a substantially impervious underground chamber. A specific object of the invention is to provide a method of storing gas in an impervious underground chamber under superatmospheric pressure.

Other objects, details and advantages will become apparent as the description of the invention proceeds.

Rock salt exists beneath the surface of the earth in varying thicknesses and at various depths. The commercial recovery of salt from such salt beds has long been practiced by sinking a tube or casing down into the bed, supplying water to the bed through such tube to dissolve a portion of the salt, and pumping out the so formed brine. A cavity of considerable extent is thus produced in the bed. Since the walls of such cavity are composed of solid salt, they are substantially impervious.

In accordance with the invention, natural or manufactured gas, as it is produced, is fed into a preformed cavity in a salt bed and maintained therein under any desired pressure for release to users of the gas. The formation of the cavity is a self-liquidating expense through recovery of the salt and there is substantially no maintenance expense as now required in the provision and maintenance of metal and like storage facilities. The danger from fire and explosion is practically eliminated and in the case of hydrocarbon liquids loss through evaporation is avoided. Gas so stored may be delivered to users at faster and more uniform rates than under present arrangements for natural gas, and without heating or other treatment of the gas. This overcomes one of the major difficulties in the use of natural gas.

The gas from a natural gas well or from a gas manufacturing plant is pumped into such underground cavities, located at desired or convenient points for storage and distribution and maintained under desired pressure having regard to distribution requirements. Its release for distribution is controlled by any suitable pressure regulating means.

While the invention has particular reference to the storage of heating gas, it will be understood that oil and other liquids, which do not dissolve the salt, may also be stored in the chambers described.

What is claimed is:

1. A method of storing fluids which comprises feeding the fluid to be stored into a preformed substantially impervious cavity in a natural rock salt bed beneath the surface of the earth *formed by dissolving the salt with water and removing the so formed brine,* said fluid being of such nature that it is substantially unaffected by the salt forming the walls of the cavity.

2. A method of storing gas for heating purposes which comprises pumping the gas to be stored under pressure into a preformed substantially impervious cavity in a natural salt bed beneath the surface of the ear, *said cavity being formed by dissolving the salt with water and removing the so formed brine.*

3. A method of storing natural or manufactured gas for heating purposes which comprises pumping the gas to be stored under pressure into a preformed substantially impervious cavity in a natural rock salt bed beneath the surface of the earth, *said cavity being formed by dissolving the salt with water and removing the so formed brine,* and maintaining the stored gas in the cavity under superatmospheric pressure.

4. The method of storing hydrocarbon fluids which comprises feeding the hydrocarbon fluid to be stored into a preformed substantially impervious cavity in a natural rock salt bed beneath the surface of the earth, *said cavity being formed by dissolving the salt with water and removing the so formed brine,* and said hydrocarbon fluid being of such nature that it is substantially unaffected by the salt forming the walls of the cavity.

*5. A method which comprises (1) introducing fluid to be stored into a preformed substantially impervious subterranean cavity in a natural rock salt bed formed by dissolving the salt with water and removing the so formed brine, and (2) maintaining the fluid in the cavity under superatmospheric pressure, said fluid being of such nature that it is substantially unaffected by the salt forming the walls of the cavity.*

*6. A method as set forth in claim 5, wherein a hydrocarbon fluid is stored in the subterranean cavity.*

References Cited in the file of this patent or the original patent

UNITED STATES PATENTS 1,960,932 Tracy ---------- May 29, 1934

FOREIGN PATENTS 298,459 Germany ---------- of 1919

OTHER REFERENCES

Publication: Proceedings of 30th Annual Meeting, American Institute of Refrigeration, May 12–13, 1941, Press of Ice and Refrigeration, Nickerson and Collins Co., Chicago, pages 164 and 165.